March 17, 1959     F. R. STEUART     2,877,595

ICE FISHERMAN'S ANGLING HOLE PLUG

Filed Jan. 20, 1958

INVENTOR
FRANK R. STEUART
BY
Williamson, Schroeder, Adams & Palmatier
ATTORNEYS

United States Patent Office 2,877,595
Patented Mar. 17, 1959

2,877,595

ICE FISHERMAN'S ANGLING HOLE PLUG

Frank R. Steuart, Henning, Minn.

Application January 20, 1958, Serial No. 709,915

5 Claims. (Cl. 43—56)

This invention relates to angling hole plugs for ice fishermen. More particularly it relates to devices designed to maintain an angling hole for an ice fisherman in an open condition even though the ice hole is left unattended over a long period of time.

The sport of angling for fish through a hole in the ice has gained substantially in popularity in recent years. Although not all, most of this angling is done from within fish houses, the interior of which is lighted. Such fishermen however, encounter two main difficulties in enjoying their angling sport. One of these difficulties is that each time after completing their fishing the ice will freeze over their angling hole before they return to again use the same. This means that each time they want to enjoy the sport of angling through the ice, they must first engage in considerable labor in chopping a new hole through the ice, which in some of the more northern areas reaches a very substantial thickness. The second difficulty involved in angling through the ice is the problem of preserving the minnows for future use. The number of minnows which are used by an ice fisherman are relatively small. For example, several dozen of minnows will last the average ice fisherman over quite an extended period and if he can maintain the minnows in an alive and active condition, he will have sufficient minnows for a great deal of fishing upon quite a number of different occasions. Since the average fisherman has no place to preserve his minnows he frequently has to purchase new minnows each time he wishes to fish and retailers of minnows generally sell the same in relatively large quantities, so that each time there is a substantial waste involved, for the average individual fisherman. My invention is designed to simultaneously overcome both of these difficulties.

It is a general object of my invention to provide a novel and improved ice hole plug which is both simple and inexpensive to manufacture and use.

A more specific object is to provide a novel and improved ice hole plug which will enable a fisherman to maintain his ice fishing hole in open condition over prolonged periods of absence or unattendance and which can easily and readily be removed from the ice.

Another object is to provide a novel and improved ice hole plug which will enable a fisherman to maintain his ice fishing hole in open condition over prolonged periods of absence or unattendance and which will at the same time enable him to preserve his minnows over the same periods of time and repeatedly from one fishing period to another.

These and other objects and advantages of my invention will more fully appear from the following description, made in connection with the accompanying drawings, wherein like reference characters refer to the same or similar parts through the several views and in which.

Figure 1:
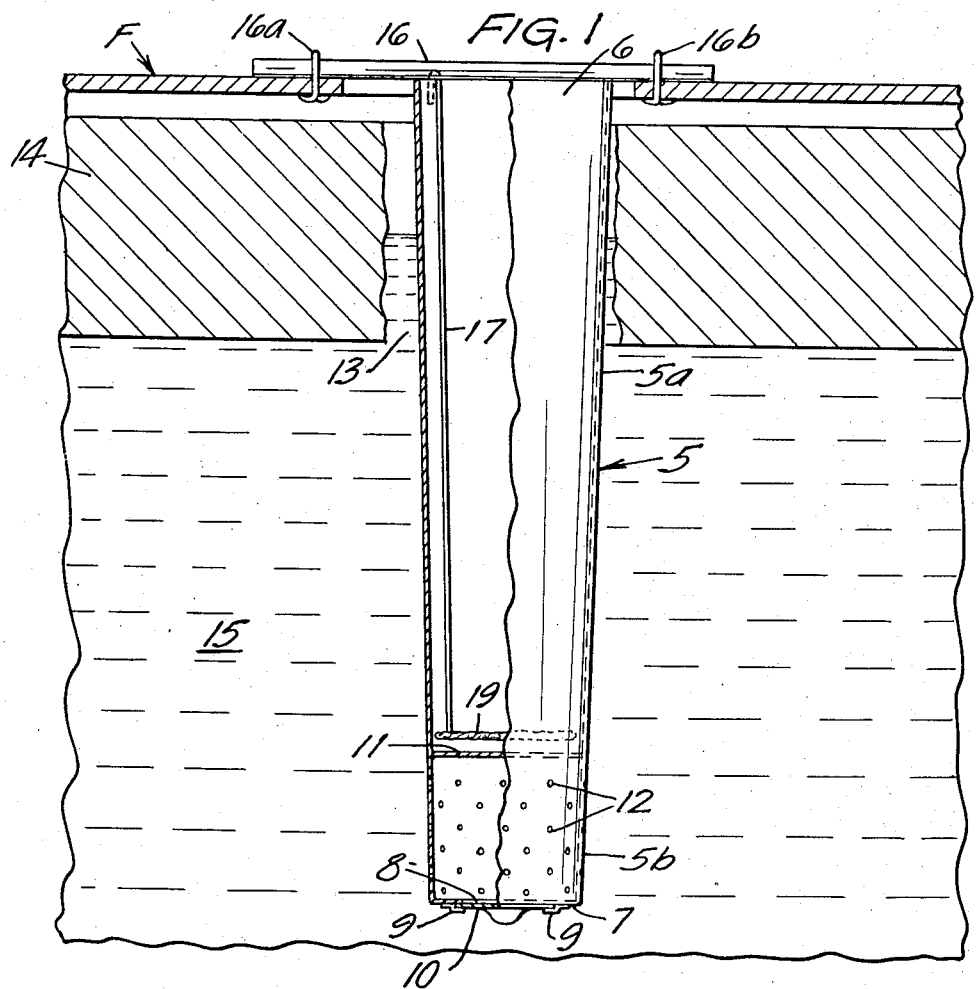
Fig. 1 is an elevational view, partly in section, showing one embodiment of my invention being in position and being utilized within an angling hole in the ice, to maintain the hole in open condition and simultaneously preserve the fisherman's minnows.
Figure 3:
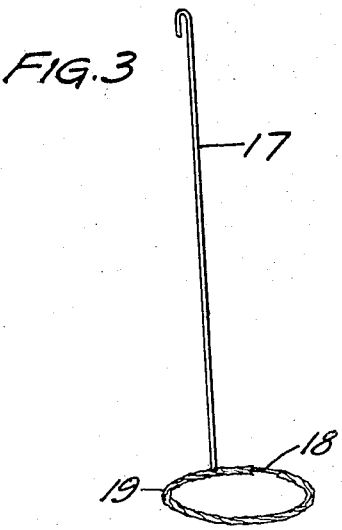
Fig. 3 is a perspective view of the torch bearing device utilized in conjunction with my invention.
Figure 2:
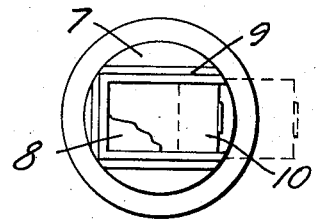
Fig. 2 is a bottom elevational view of the same.

One embodiment of my invention may include as shown in Figs. 1–3 a frusto-conically shaped tubular member 5 made of metal and having an open end as at 6. The lower end of the tubular member 5 is closed with a plate or end wall 7. This plate or end wall 7 has an opening 8 formed therein which is surrounded by a U-shaped channel 9. Slidably mounted in the channel 9 is a sliding door 10 which can be slid to open position as indicated by the broken lines in Fig. 2 to provide access to the interior of the tubular member via the opening 8.

As best shown in Fig. 1 the tubular member 5 has an upper portion 5a which is imperforate and a lower portion 5b which is perforated. A panel 11 extends across the interior of the tubular member 5 and closes off the same to prevent fluid communication between the upper and lower portions of the tubular member 5. This panel 11 is preferably made of metal and is imperforate and serves to divide the upper portion 5a of the tubular member from the lower portion 5b. The perforations 12 of the lower portion 5b of the tubular member 5 are sufficiently large to permit water to pass freely therethrough but are sufficiently small to prevent minnows from escaping from the interior of the lower portion 5b.

Fig. 1 shows the tubular member 5 in position in the hole indicated by the numeral 13 in the layer of ice 14 covering a body of water 15. A pipe 16 is shown extended across the top of the member 5 and secured by a pair of loops 16a and 16b to the floor F of the fish house.

Fig. 3 shows a torch bearing device which may be utilized in conjunction with my invention. It consists of an elongated rod 17 having a metal ring 18 secured to its lower end. Wrapped or wound around the metal ring 18 is a wick 19 or other body capable of absorbing a liquid fuel.

In use the fisherman, upon terminating his fishing activities, will place the remaining minnows which he has in his possession in the lower perforated portion 5b of the tubular member 5 via the opening 8 by first sliding the sliding door 10 to open position. He then closes the door 10 and inserts the lower end of the tubular member 5 down into the water and presses the tubular member downwardly to a substantial depth so that a considerable amount of water is displaced by the tubular member. The tubular member 5 which is tapered downwardly and inwardly, is then secured in the desired position by inserting the pipe 16, into the loops 16a and 16b, or by some other suitable means to prevent the same from being forced upwardly by the buoyancy of the water. In any event, the tubular member 5 is secured in the position shown until the water surrounding the upper portions of the tubular member freezes and secures the tubular member in that position. Some of the cold air of course, will descend into the interior of the upper portion 5a of the tubular member 5 so that a coating of ice will be formed around the tubular member 5 adjacent the lower surface of the ice layer. The minnows will be maintained at a substantial depth below the freezing level and will remain alive and active for extended periods.

When it is desired to remove the ice plug in order to do additional fishing, the fisherman merely dips the wick 19 in fuel oil or alcohol or some other suitable highly combustible fuel and lights the same and then inserts the rod 18 with the wick 19 downwardly to the elevation shown within the interior of the upper portion 5a of the tubular member. The heat which is generated by the combustion of the fuel oil on the wick 19 will quickly be transmitted by the metal walls of the tubular member 5 so as to melt the ice surrounding the same. With the result that the buoyancy of the water will force the tubular member 5 to shoot upwardly in a very short period of time. Care should be taken to prevent the occasion of injury by the sudden upward thrust of the tubular member 5 by the buoyancy of the water when this takes place. The fisherman can then withdraw the tubular member 5 and remove his minnows from the lower portion 5b and place them in the usual minnow container for preservation during the period of fishing. When he has completed his fishing activities he can again replace the minnows in the lower portion 5b and replace the tubular member 5 in the position shown in Fig. 1 with assurance that upon his return the next day or several days later, he can quickly and easily reopen his angling hole in the ice and have lively and active minnows awaiting him.

From the above it can be seen that I have provided a simple and inexpensive device which simultaneously overcomes the two major problems of ice angling which tend to discourage fishermen from doing more of the same and to lessen the enjoyment of those who do participate in this sport. This device can be manufactured very inexpensively and is simple to utilize.

It will, of course, be understood that various changes may be made in the form, details, arrangement and proportions of the parts without departing from the scope of my invention which consists of the matter shown and described herein and set forth in the appended claims.

What I claim is:

1. An ice hole plug comprising an elongated tubular member formed of heat-conducting material and having an open upper end, means extending across the interior of said tubular member and closing it off intermediate its ends and dividing said tubular member into an upper and lower portion, the upper portion of said tubular member being imperforate adjacent and above said means and the lower portion of said tubular member being perforated, the perforations in said lower portion being sufficiently small to prevent minnows from passing therethrough, and means closing off the lower end of said tubular member to retain minnows within said lower portion, said last mentioned means including closure mechanism providing access to the interior of said lower portion of said tubular member to permit minnows to be inserted into and removed from said lower portion of said tubular member.

2. The structure defined in claim 1 wherein said upper portion of said tubular member tapers inwardly and downwardly.

3. The structure defined in claim 1 wherein said tubular member is generally frusto-conical in shape.

4. An ice hole plug comprising an elongated generally frusto-conically shaped metal tubular member having an open upper end and tapering inwardly and downwardly, said tubular member having an imperforate upper portion and a perforated lower portion constructed and arranged to permit water to pass freely therethrough and to prevent minnows from passing therethrough, an imperforate panel extending across the interior of said tubular member and sealing off the interior of said upper portion from the interior of said lower portion, a wall extending across the lower end of said tubular member and closing off the same, and a door mounted on said wall and providing access to the interior of said lower portion of said tubular member to permit minnows to be inserted and removed from the interior of said lower portion of said tubular member.

5. An ice hole plug comprising an elongated metal tubular member tapering inwardly toward its lower end, said tubular member being divided into an imperforate upper portion and a perforated lower portion, said lower and upper portion being separated in fluid non-communicating relationship, said tubular member having its upper end open and having its lower portion closed sufficiently to prevent the escape of minnows from the interior of said lower portion, said lower portion being constructed and arranged to provide access to its interior to permit minnows to be placed therewithin or removed therefrom as desired.

References Cited in the file of this patent
UNITED STATES PATENTS
2,799,146    Meagher _____ July 16, 1957